(12) United States Patent
He et al.

(10) Patent No.: US 10,998,005 B2
(45) Date of Patent: May 4, 2021

(54) METHOD AND APPARATUS FOR PRESENTING MEDIA INFORMATION, STORAGE MEDIUM, AND ELECTRONIC APPARATUS

(71) Applicant: Tencent Technology (Shenzhen) Company Limited, Shenzhen (CN)

(72) Inventors: Jing He, Shenzhen (CN); Zixin Zou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/682,874

(22) Filed: Nov. 13, 2019

(65) Prior Publication Data

US 2020/0082850 A1 Mar. 12, 2020

Related U.S. Application Data

(63) Continuation of application No. PCT/CN2018/116957, filed on Nov. 22, 2018.

(30) Foreign Application Priority Data

Dec. 15, 2017 (CN) .......................... 201711352237.6

(51) Int. Cl.
*G11B 27/036* (2006.01)
*G06F 3/0484* (2013.01)
(Continued)

(52) U.S. Cl.
CPC ............ *G11B 27/036* (2013.01); *G06F 3/165* (2013.01); *H04N 9/8715* (2013.01); *G06F 3/0484* (2013.01)

(58) Field of Classification Search
CPC ..... G11B 27/036; G06F 3/165; G06F 3/0484; H04N 9/8715
See application file for complete search history.

(56) References Cited

U.S. PATENT DOCUMENTS

2007/0112940 A1* 5/2007 Morisawa ............... G06F 16/64
709/219
2007/0238082 A1* 10/2007 Ingrassia .............. G09B 23/285
434/307 A
(Continued)

FOREIGN PATENT DOCUMENTS

CN 103577511 A 2/2014
CN 103793446 A 5/2014
(Continued)

OTHER PUBLICATIONS

Office Action dated Mar. 6, 2020 for Chinese Application No. 201711352237.6 with concise English Translation, 15 pages.
(Continued)

*Primary Examiner* — Thai Q Tran
*Assistant Examiner* — Jose M Mesa
(74) *Attorney, Agent, or Firm* — Brinks Gilson & Lione

(57) ABSTRACT

The present disclosure describes embodiments of a method, a device, and a non-transitory computer readable storage medium for presenting media information. The method includes displaying, by a device, an interaction interface. The device includes a memory storing instructions and a processor in communication with the memory. The method includes obtaining, by the device, an image set through the interaction interface, the image set comprising at least one image. The method includes obtaining, by the device, target media based on the image set through the interaction interface, the target media comprising a first audio generated (Continued)

according to an image feature of the image set. The method includes presenting, by the device, the target media.

18 Claims, 11 Drawing Sheets

(51) Int. Cl.
*G06F 3/16* (2006.01)
*H04N 9/87* (2006.01)

(56) References Cited

U.S. PATENT DOCUMENTS

| | | | |
|---|---|---|---|
| 2008/0004732 A1* | 1/2008 | Hoshino | G11B 27/34 700/94 |
| 2008/0092050 A1* | 4/2008 | Wu | G06F 16/489 715/730 |
| 2017/0270222 A1 | 9/2017 | Wang et al. | |
| 2018/0115592 A1* | 4/2018 | Samineni | H04N 21/4661 |

FOREIGN PATENT DOCUMENTS

| | | |
|---|---|---|
| CN | 104615689 A | 5/2015 |
| CN | 106503055 A | 3/2017 |
| CN | 106662920 A | 5/2017 |
| CN | 108334540 A | 7/2018 |

OTHER PUBLICATIONS

International Search Report and Written Opinion dated Jan. 29, 2019 for PCT Application No. PCT/CN2018/116957 with English translation (9 pages).

Chinese Office Action regarding Chinese Patent Application No. 201711352237.6 filed Dec. 15, 2017, with concise English translation, 11 pages.

\* cited by examiner

|  | Beat 1 | Beat 2 | Beat 3 | Beat 4 |
|---|---|---|---|---|
| 8 words | 城市中的<br>(chéng shì zhōng de) | 高楼大(gāo lóu dà) | 厦(shà) |  |
| 13 words | 戴墨镜的<br>(dài mò jìng de) | 男生(nán shēng) | 在海边的<br>(zài hǎi biān de) | 自拍照(zì pāi zhào) |

FIG. 5

METHOD AND APPARATUS FOR PRESENTING MEDIA INFORMATION, STORAGE MEDIUM, AND ELECTRONIC APPARATUS

RELATED APPLICATION

This application is a continuation application of PCT Patent Application No. PCT/CN2018/116957, filed on Nov. 22, 2018, which claims priority to Chinese Patent Application No. 201711352237.6, filed with the Chinese Patent Office on Dec. 15, 2017, both of which are incorporated herein by reference in their entireties.

FIELD OF THE TECHNOLOGY

Embodiments of this application relates to the field of the Internet, and specifically, to a method and an apparatus for presenting media information, a storage medium, and an electronic apparatus.

BACKGROUND OF THE DISCLOSURE

Recently, with development of multimedia technologies, types of multimedia content tend to be diversified, for example, movies, series, home videos, news, documentaries, music content, life real-time scenes, online novels, and text news. Correspondingly, diverse demands of users emerge.

For example, to combine collected or captured photos into a video, the photos may be produced by using an animation effect in PowerPoint to into a PPT file, then, the PPT file is converted into a video album, and specific steps are as follows:

1) Open PowerPoint, find an "Insert" option, then select a to-be-inserted album, and import photos in a computer into an empty PPT file one by one.

2) Select, after the photos are inserted into the PPT file, a quick style for the photos to make the photos look more beautiful, and then set a background image for the photos, where images of different styles may be select as a background image for the photos according to requirements.

3) Add an animation effect. Specifically, an animation effect may be selected in PowerPoint. There are basic styles, miniature styles, gentle styles, and ornate styles. According to personal preference, different animation effects may be set for all the photos, or a same animation effect may be applied to all the photos by using an animation brush.

4) Save a PPT album after settings of the animation effect and a special switching effect are completed, where in this case, the album can only be played on a computer or a projector, and is not a real video, and then, convert the PPT album into a video by using software of producing a video with photos.

There are the following problems in the foregoing technical solution:

1) With popularity of smart mobile terminals, mobile phones, tablet computers, and the like have become main devices for life and work. However, the foregoing solution relies on PowerPoint and video conversion software on a PC computer, which is inconvenient to a user because the user needs to find a PC computer during production. In addition, even though operations can be performed on a mobile phone or a tablet computer, the operations are extremely inconvenient due to a relatively small screen.

2) Steps of producing a video are relatively complex, and a user is required to have specific computer skills and know how to use PowerPoint and video conversion software.

Similarly, in some environments, because of a special agreement between a mood and an environment at that time, tourists often feel like that they want to create some songs, but ordinary people do not have skills to compose lyrics and music, and need to turn to professionals with these skills for help. This will cause problems similar to the foregoing problems of video combination.

A professional with a music composing skill needs to carefully learn description of a tourist, and compose music according to the description of the tourist. After carefully learning the description of the tourist, a professional with a lyric composing skill composes lyrics according to the description of the tourist. Then recording is performed, during the recording, the tourist also needs to read a music score and learn how to use various recording devices. For a tourist lacking musical skills, the entire process is relatively complex.

With regard to the technical problem that steps of producing media information in the related technology are relatively complex, no effective solution has been proposed currently.

SUMMARY

Embodiments of this application provide a method and an apparatus for presenting media information, a storage medium, and an electronic apparatus, to at least resolve the technical problem that steps of producing media information in the related technology are relatively complex.

The present disclosure describes embodiments of a method for presenting media information. The method includes displaying, by a device, an interaction interface. The device includes a memory storing instructions and a processor in communication with the memory. The method includes obtaining, by the device, an image set through the interaction interface, the image set comprising at least one image. The method includes obtaining, by the device, target media based on the image set through the interaction interface, the target media comprising a first audio generated according to an image feature of the image set. The method includes presenting, by the device, the target media.

The present disclosure describes embodiments of a device for presenting media information. The device includes a memory storing instructions; and a processor in communication with the memory. When the processor executes the instructions, the processor is configured to cause the device to display an interaction interface, and obtain an image set through the interaction interface, the image set comprising at least one image. When the processor executes the instructions, the processor is configured to cause the device to obtain target media based on the image set through the interaction interface, the target media comprising a first audio generated according to an image feature of the image set, and present the target media.

The present disclosure describes embodiments of a non-transitory computer readable storage medium storing computer readable instructions. The computer readable instructions, when executed by the processor, are configured to cause the processor to perform displaying an interaction interface on a client; and obtaining an image set through the interaction interface, the image set comprising at least one image. The computer readable instructions, when executed by the processor, are configured to cause the processor to perform obtaining target media based on the image set through the interaction interface, the target media comprising a first audio generated according to an image feature of the image set; and presenting the target media on the client.

According to an aspect of the embodiments of this application, a method for presenting media information is provided, including: displaying an interaction interface, the interaction interface being an interaction interface that is on a client and that is configured to obtain an image; obtaining target media in a case of obtaining an image set through the interaction interface, the target media carrying at least first audio, the first audio being audio generated according to an image feature of the image set; and presenting the target media on the client.

According to an aspect of the embodiments of this application, a method for presenting media information is provided, including: obtaining request transmitted by a client, the request carrying a image set; generating first audio based on the image set, the first audio being audio generated according to an image feature of the image set; and transmitting feedback to the client, and indicating, through the feedback, target media used for presentation on the client, the target media carrying at least the first audio.

According to another aspect of the embodiments of this application, an apparatus for presenting media information is further provided, including one or more processors and one or more memories storing program units, the program units being executed by the processor and including: a display unit, configured to display an interaction interface, the interaction interface being an interaction interface configured to obtain an image; a determining unit, configured to obtain target media in a case that an image set is obtained through the interaction interface, the target media carrying at least first audio, the first audio being audio generated according to an image feature of the image set; and a presentation unit, configured to present the target media.

According to another aspect of the embodiments of this application, an apparatus for presenting media information is further provided, including one or more processors and one or more memories storing program units, the program units being executed by the processor, and including: an obtaining unit, configured to obtain request transmitted by a client, the request carrying a image set; a generation unit, configured to generate first audio based on the image set, the first audio being audio generated according to an image feature of the image set; and a transmitting unit, configured to transmit feedback to the client and indicate, through the feedback, target media used for presentation on the client, the target media carrying at least first audio.

According to another aspect of the embodiments of this application, a storage medium is further provided, including a stored program, the program, in a case of being run, performing the foregoing method.

According to another aspect of the embodiments of this application, an electronic apparatus is further provided, including a memory, a processor, and a computer program that is stored on the memory and that can be run on the processor, the processor performing the foregoing method through the computer program.

In the embodiments of this application, target media is obtained in a case that an image set is obtained through the interaction interface, the target media carries at least first audio, and the first audio is generated according to an image feature of the image set; and the target media is presented on the client. Because a process of generating the target media is performed by a terminal or a server, the technical problem that steps of producing media information in the related technology are relatively complex may be resolved, so as to achieve a technical effect of reducing the complexity of producing media information.

BRIEF DESCRIPTION OF THE DRAWINGS

Accompanying drawings described herein are used to provide further understanding about the embodiments of this application, and constitute one portion of the embodiments of this application; and exemplary embodiments of this application and their descriptions are used to explain this application, and do not constitute an inappropriate limit on this application. In the figures:

FIG. 5 is a schematic diagram of an optional rhythm according to an embodiment of this application.

DESCRIPTION OF EMBODIMENTS

To enable a person skilled in the art to better understand the solutions of embodiments of this application, the technical solutions of the embodiments of this application will be described clearly and completely below with reference to the accompanying drawings of the embodiments of this application. Apparently, the described embodiments are merely some but not all of the embodiments of this application. All other embodiments obtained by a person of ordinary skill in the art based on the embodiments of this application without creative efforts shall fall within the protection scope of the embodiments of this application.

In the specification, claims, and accompanying drawings of this application, the terms "first", "second", and so on are intended to distinguish between similar objects rather than indicating a specific order. It is to be understood that the data termed in such a way are interchangeable in proper circumstances, so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

First, some nouns or terms appearing in the process of describing the embodiments of this application are applicable to the following explanations:

Text-to-speech (TTS): A text is converted in general language into a speech, and a tone, an intonation, and the like of the synthesized speech may be customized.

According to an aspect of the embodiments of this application, a method embodiment of a method for presenting media information is provided.

Figure 1:
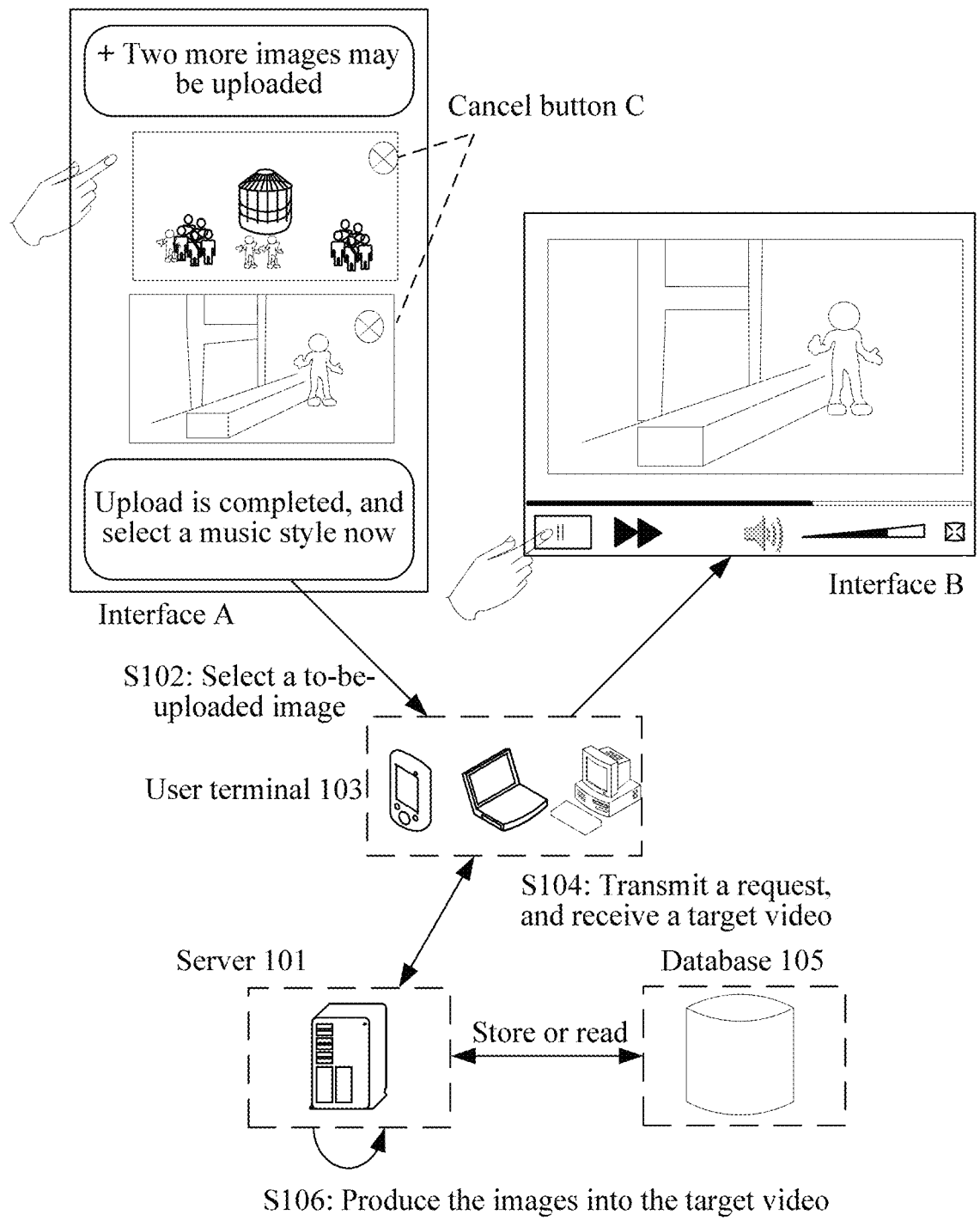
FIG. 1 is a schematic diagram of a hardware environment of a method for presenting media information according to an embodiment of this application.

Optionally, in this embodiment, the method for presenting media information may be applied to a hardware environment including a server 101 and a terminal 103 (may also include a storage database 105) shown in FIG. 1. As shown in FIG. 1, the server 101 is connected to the terminal 103 through a network. The network includes but is not limited to: a wide area network, a metropolitan area network, and a local area network. The terminal 103 is not limited to a PC, a mobile phone, a tablet computer, and the like. The method for presenting the media information of this embodiment of this application may be performed by the server 101, the terminal 103, or the server 101 and the terminal 103 together. The terminal 103 may also perform the method for presenting the media information of this embodiment of this application by using a client installed on the terminal 103.

For example, in a case that the method for presenting the media information of this embodiment of this application is performed by the server 101 and the terminal 103, the following steps are included.

Step S102: A user selects a to-be-uploaded image in a first interface A, and selects a music style after the image is uploaded.

Optionally, during the process of selecting the image, the interface may prompt a quantity of images that can be uploaded currently, for example, "Two more images may be uploaded". For an image that has been uploaded, the user may cancel upload of the image by using a "Cancel button C". Similarly, the image that has been uploaded may also be replaced with another image in a replacement manner.

Step S104: A terminal interacts with a server, including: transmitting, by the terminal, the image uploaded by the user to the server in a form of a video request and receiving target media (for example, a target video) produced by the server. In one implementation, the target media may be referred as target media information.

Step S106: The server produces the image into the target media (for example, the target video).

In response to receiving the image, the server may generate first audio according to an image feature of the image set, and produces the target media including the image set and the first audio.

Optionally, data that the server needs to use during operation may be stored or read by interacting with the database.

After receiving the target media returned by the server, the terminal may display the target media by using an interface B.

The foregoing embodiment of this application is described by using an example that the method for presenting the media information is performed jointly by the server 101 and the terminal 103, which is merely an optional embodiment. The advantage of doing so is that video production is performed by the server in consideration of relatively weak computing resources of the mobile terminal and a limited power of the terminal. Alternatively, relevant operations of producing the target media may be performed by the terminal, that is, the method for presenting the media information of this embodiment of this application may be performed by the terminal 103 or a client on the terminal 103.

Figure 2:
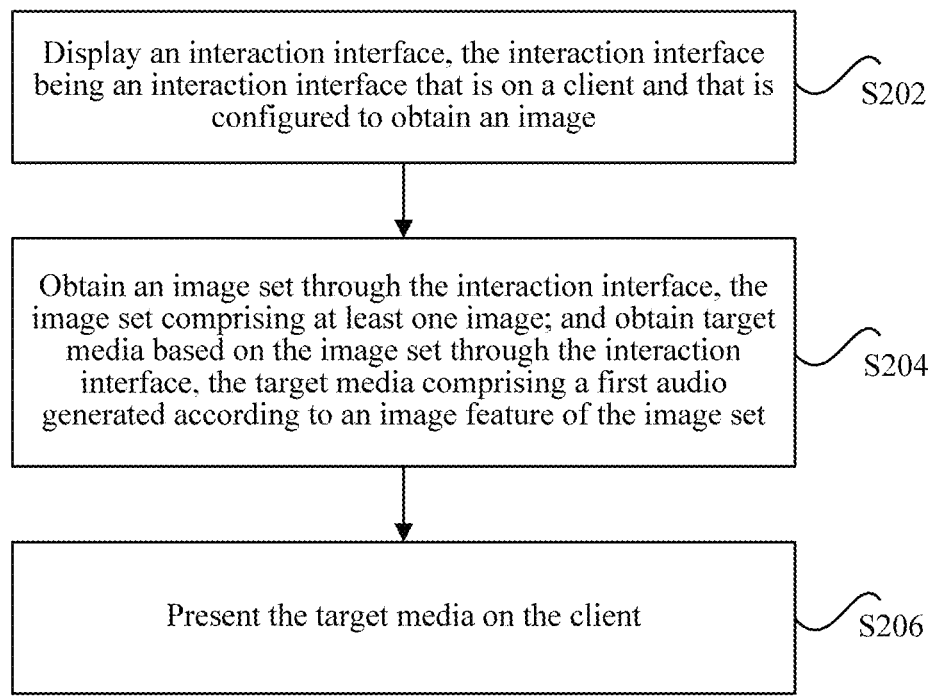
FIG. 2 is a flowchart of an optional method for presenting media information according to an embodiment of this application.

FIG. 2 is a flowchart of an optional method for presenting media information according to an embodiment of this application. As shown in FIG. 2, the method may be run on a terminal or a client of the terminal. An example in which the method is performed by the client on the terminal is used below for description. The method may include the following steps.

Step S202: Display an interaction interface, the interaction interface being an interaction interface that is on the client and that is configured to obtain an image.

Optionally, in a case that the media information (such as a video or audio) is produced by a server, the foregoing interaction interface is an upper-layer display interface of an image upload interface between the terminal and the server. The upload interface may be informed of a to-be-uploaded image through an interactive operation (for example, clicking on the symbol "+" in an interface A shown in FIG. 1 and selecting a corresponding image) on the interaction interface.

Step S204: Obtain an image set through the interaction interface, the image set comprising at least one image; and obtain target media based on the image set through the interaction interface, the target media comprising a first audio generated according to an image feature of the image set. The client may obtain the target media in a case of obtaining an image set through the interaction interface, the target media carrying at least first audio, the first audio being audio generated according to an image feature of the image set. The target media is determined based on the image set, and a specific determination process may be performed on the client or a server.

Optionally, the obtaining an image set through the interaction interface includes: displaying prompt information in the interaction interface in a case that a quantity of the obtained image set is less than a threshold (such as 10 or 5), the prompt information being used to prompt a quantity of image set that can be uploaded currently (or a quantity of image set that have been uploaded currently); obtaining, in a case that an upload event is detected on the interaction interface, the image set according to a path indicated by the upload event; and updating the quantity of image set that can be uploaded currently (or the quantity of image set that have been uploaded currently) prompted by the prompt information.

Optionally, in a case that the target media only carries the first audio, the target media is equivalent to audio media information. The target media may further carry text information, for example, text information (such as lyrics) corresponding to the first audio. In this case, the target media is equivalent to music media information with embedded lyrics. The target media may further carry the image set. In this case, the target media is equivalent to a video such as an MV video. In one implementation, the video may be referred as the video.

The quantity of the foregoing image set is at least one. A plurality of image set is selected preferably to make the produced target media more abundant. Producing the first audio means regenerating first audio according to the image feature corresponding to the image instead of selecting one of a plurality of pieces of preset audio (such as background music) for an image. That is, the obtained pieces of first audio are different in response to different image set.

The reason why the first audio is generated according to the image feature in the image is that scenes or photographed objects of different images usually have a specific artistic conception. Similarly, different types of music audio (the first audio) usually represent a specific artistic conception. Regenerating first audio according to the image feature in the image means generating first audio that matches the artistic conception.

Step S206: Present the target media on the client. In one implementation, step S206 may include: display the target media on the client.

Through the foregoing steps S202 to S206, the target media is obtained in a case that the image set is obtained through the interaction interface, the target media carries at least first audio, and the first audio is generated according to an image feature of the image set; and the target media is presented on the client. Because a process of generating the target media is performed by the terminal or the server, the technical problem that steps of producing media information in the related technology are relatively complex may be resolved, so as to achieve a technical effect of reducing the complexity of producing media information.

In the technical solution of this embodiment of this application, based on image description generation, lyrics and music are automatically composed according to a plurality of images uploaded by a user, and presentation is performed in a manner of playing a music MV clip (that is, the target media), to implement diverse and interesting presentation of the technology. Optionally, in an image description generation process, lyrics may be automatically produced according to the image feature. Detailed descriptions are provided below with reference to step S204 and step S206.

In the technical solution provided by step S204, target media is obtained in a case that an image set is obtained through the interaction interface. The target media carries at least first audio, and the first audio is generated according to an image feature of the image set.

Optionally, in a case that the process of generating the target media is performed on the client, then the client may perform the following steps.

Step S2041: The terminal obtains first information (such as lyrics) used to represent an image feature of a image set, and obtains a music score of a music type. The music type is a music type indicated by a user. In one implementation, the music type may be a target music type.

Step S2042: The terminal converts the first information into first audio according to a target music score (that is, the music score of the music type).

Step S2043: The terminal fills the image set and the first audio into a video template to obtain the target media, or uses the first audio directly as the target media.

Optionally, in a case that the process of generating the target media is performed on the server, then the terminal may obtain the target media through the following steps.

Step S2044: The terminal transmits request to the server. The request may include the image set, and the server is configured to generate the first audio according to the image feature of the image set. In one implementation, the request may be referred as the request information.

Optionally, in a case that the terminal transmits the request to the server, the terminal may transmit request carrying a music type identifier to the server, and the server converts the first information into the first audio of the music type. The music type is a music type indicated by the music type identifier.

Step S2045: The terminal receives feedback returned by the server in response to the request, and at least determines the target media according to the feedback. The feedback is used to indicate the first audio. In one implementation, the feedback may be referred as the feedback information.

In a case that the to-be-generated target media is audio, then the received first audio is used directly as the target media.

Optionally, the at least determining the target media according to the feedback includes: determining the target media according to the image set and the first audio. The target media is a video carrying the first audio and the image set.

Optionally, the foregoing first audio is music audio using the first information (which may be referred to as image description generation, which is based on computer vision, extracting an image feature by using information of a scene and an object type as prior knowledge and collaboratively generating an image description sentence including the scene and the object type) as lyrics. The first information is used to represent an image feature of the image set. The foregoing feedback includes but is not limited to the following forms:

First, the feedback carries the first audio. In a case of storing a video template locally, the terminal may fill, in a case of determining the target media according to the feedback, the image set and the first audio carried in the feedback into the video template to obtain the target media.

Second, in a case that the terminal does not store a video template, the server may add the first audio and the video template to the feedback. The terminal may fill, in a case of determining the target media according to the feedback, the image set and the first audio carried in the feedback into the video template to obtain the target media.

Third, the server directly carries the template video in the feedback, fills the image set and the first audio into the video template, and adds the obtained target media to the feedback and transmits the feedback to the client. The terminal may directly obtain, in a case of determining the target media according to the feedback, the target media carried in the feedback.

With regard to how the terminal or the server generates the target media, similar manners are used. Specifically, in subsequent embodiments, the example in which the server generates the target media is used for description.

In the technical solution provided by step S206, the target media is presented on the client.

Optionally, the presenting the target media on the client includes but is not limited to the following forms:

(1) The target media is directly played on the client.

(2) Identifier information of the target media is presented on the client. For example, a specific frame of image or an abstract in the target media is presented. As shown in the interface B in FIG. 1, the user may click implement playback by clicking a play button, a continue button, or the like in this interface.

Optionally, the target media is video. During or after the presenting the target media on the client, in a process of playing the video, a plurality of image set are presented in the video, and music audio with the first information as the lyrics is played. The first audio includes music audio, and a section of lyrics (corresponding to a first language text) in the first information is used to represent an image feature of a corresponding image set.

Optionally, during playing, lyrics may also be presented in the video.

Figure 3:
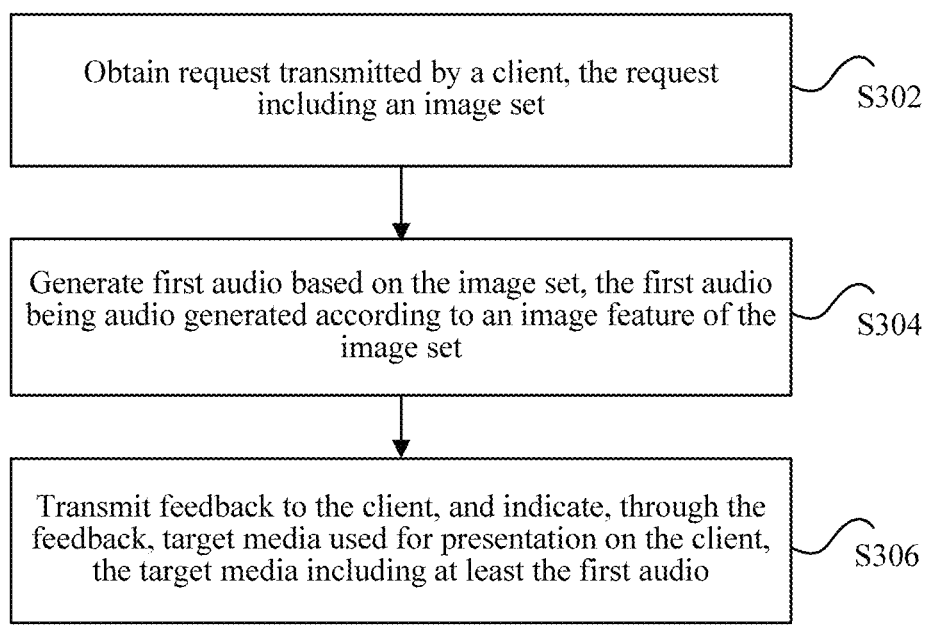
FIG. 3 is a flowchart of another optional method for presenting media information according to an embodiment of this application.

According to an aspect of the embodiments of this application, a method embodiment of a method for presenting media information is further provided. This method may be run on a server. An example in which the method is performed by the server is used below for description. As shown in FIG. 3, the method may include the following steps:

Step S302: The server obtains request transmitted by a client, the request may include an image set.

Step S304: The server generates first audio based on the image set, the first audio being audio generated according to an image feature of the image set.

Step S306: The server transmits feedback to the client, and indicates, through the feedback, target media used for presentation on the client, the target media may include at least the first audio.

Through the foregoing technical solution, in a case that the request transmitted by the client is obtained, the first audio is generated based on the image set carried in the request. The first audio is audio generated according to the image feature of the image set. Feedback is transmitted to the client, and the feedback is used to indicate the target media used for presentation on the client. The target media carries at least the first audio. Because the process of generating the target media is performed by the server, the technical problem that steps of producing media information in the related technology are relatively complex may be resolved, so as to achieve a technical effect of reducing the complexity of producing media information.

This embodiment of this application is described below in detail with reference to step S304 and step S306.

In the technical solution provided by step S304, the first audio is generated based on the image set. The first audio is audio generated according to an image feature of the image set.

Optionally, the "generating first audio based on the image set" may be implemented through the following steps.

Step S3041: Obtain first information used to represent the image feature of the image set, and obtain a music score of a music type.

The music type may be a music type indicated by a music type identifier carried in the request.

The music type may also be a music type pre-configured by a server end or a default music type.

The music type may alternatively be determined by the server according to an image style of the image set. For example, a plurality of image set has various styles, and includes a street, a roof, woods, and the like, so that a corresponding music style is rap. For example, a plurality of images represents a countryside scene, so that a corresponding music style is country music or the like.

The music type may also be pre-configured in a video template. Music types of video templates may be different. In other words, selecting a video template is equivalent to selecting a corresponding music style. Introduction information (including a music type) of each video template may be transmitted to the client of the user during production of video, to allow the user to select a corresponding video template, so as to further produce the video by using the video template.

The foregoing image feature includes but is not limited to features used to represent a shot scene (such as a prosperous street, a mountain forest, and sea) and a shot object (such as a building, a person, an animal, and food). Therefore, the obtaining the first information used to represent the image feature of the image set may be implemented through the following steps.

Step S11: Identify a scene feature and/or an object feature in the image set.

Optionally, recognition may be implemented by using a deep neural network model. The deep neural network model may be trained first by using a training set (including several images whose scenes and/or objects are identified). After the deep neural network model is trained and converged, that is, the deep neural network model has a capability to identify a scene and/or an object. The image set may be converted into an RGB value as an input of the deep neural network model, and an obtained result is a scene type identifier or an object type identifier.

Step S12: Combine words used to represent the scene feature and/or the object feature in the image set into a first language text.

Figure 4:
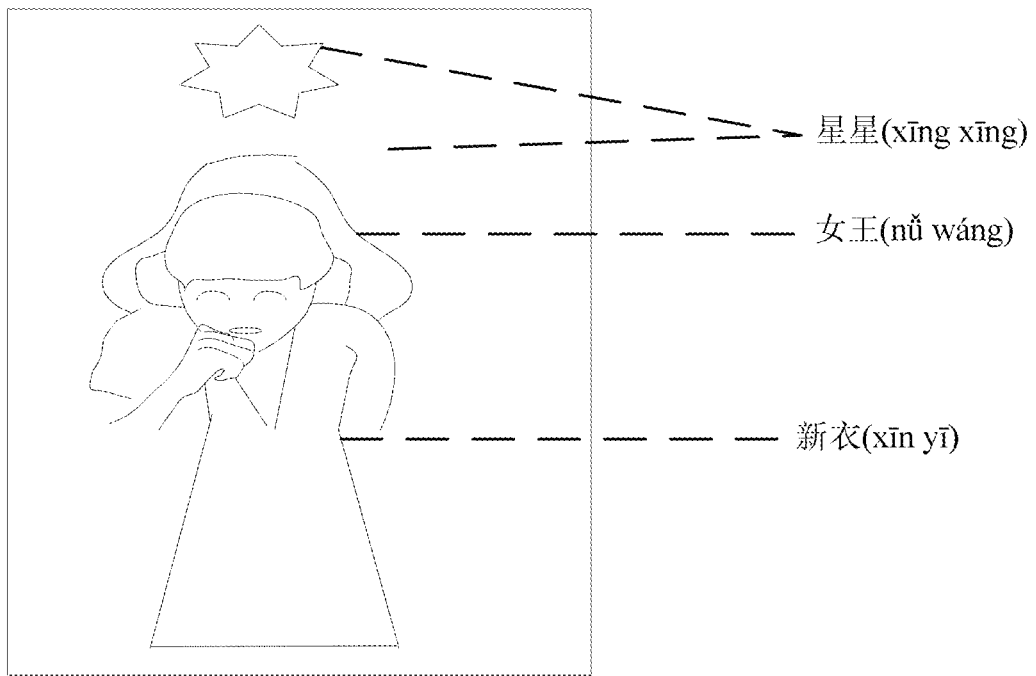
FIG. 4 is a schematic diagram of an optional photo according to an embodiment of this application.

As shown in FIG. 4, object features, such as "女王 (nǚ wáng)", "新衣 (xīn yī)", "星星 (xīng xīng)", may be recognized by using the deep neural network model. The "女王 (nǚ wáng)", "新衣 (xīn yī)", and "星星 (xīng xīng)" are processed into the first language text (or referred to as a first sentence), that is, a sentence of lyrics, by using a natural language processing algorithm. For example, the generated first language text is "女王的新衣耀眼的 星星 (nǚ wáng de xīn yī yàoyǎn de xīng xīng)".

Step S13: Determine the first information at least according to the first language text.

An optional implementation solution of "Determine the first information at least according to the first language text" is as follows:

searching for, according to the music type, a second language text matching the first language text of the image set; and combining the first language texts of a plurality of the image set and the corresponding second language texts into the first information, in the first information, a first language text corresponding to an image set being adjacent to a second language text corresponding to the same image set. In one implementation, a first language text may refer to as one sentence in a lyrics, and a second language text may refer to as another sentence in the lyrics.

Optionally, the "searching for, according to the music type, a second language text matching the first language text of the image set" may be implemented through a neural network model. The neural network model is trained in advance by using a training set (the train set includes paired lyrics, and music type of lyrics are identified). It is equivalent to that the neural network model learns a relationship between lyrics of the same music type.

For example, for music of the rap type, two sentences of lyrics are rhyming generally. That is, in a case of "searching for, according to the music type, the second language text matching the first language text of the image set (for example, finals of last words are the same or similar)", a final of the last word of the first language text may be determined first, and then, a second language text having the same final is generated or searched for. For example, the first language text is "女王的新衣耀眼的 星星 (nǚ wáng de xīn yī yào yǎn de xīng xīng)", and a final of the last word "星 (xīng)" is "ing". In this case, a second language text in which a final of a last word is "ing", for example, "穿什么衣服看我 心情 (chuān shén me yī fú kàn wǒ xīn qíng)", may be searched for or generated.

Optionally, in response to generation of the second language text matching the first language text, a type (such as clothes, a color, or a person) of a word in the first language text may also be considered, and a word the same as or similar to the word may also be used in the second language text. For example, the generated second language text is "时尚的精英搭配什么看我的心情 (shí shàng de jīng yīng dā pèi shén me kàn wǒ de xīn qíng)", where "时尚(shí shàng)" and "搭配(dā, pèi)" correspond to "新衣(xīn yī)", and "精英(jīng yīng)" corresponds to "女王(nǚ wáng)".

For each image, the generated first language text and second language text are adjacent in the first information. In a case that there is a plurality of image set, the first language text and the second language text of each image may be spliced, according to a sequence of the images, into the first information.

In a case of a plurality of first language texts, the first information may be determined at least according to the first language text in the following manners:

1) Splice a third language text into second information. The second language text is a first language text that is currently being spliced in the plurality of first language texts. In a case that the third language text is the first language text that is first spliced into the second information, then the third language text can be directly used as the second information. In a case that the third language text is not the first language text that is first spliced into the second information, the third language text can be spliced with a previous first language text that is spliced into the second information.

2) Obtain, in a case that a text feature of the third language text matches a text feature of a fourth language text, a first language text that is not spliced in the plurality of first language texts, and splice the obtained first language text with the third language text in the second information, the fourth language text being a first language text that is in the second information and that is spliced with the third language text.

3) Search for a fifth language text (any first language text that is not spliced or a first language text adjacent to the third language text) that is not spliced in the plurality of segments of the first language text in a case that the text feature of the third language text does not match the text feature of the fourth language text. A text feature of the fifth language text matches the text feature of the fourth language text.

4) Splice the fifth language text with the third language text in the second information in a case that the fifth language text is found.

5) Splice a sixth language text with the third language text in the second information in a case that the fifth language text is not found, the sixth language text being a language text whose text feature matches the text feature of the fourth language text in a plurality of language texts (which may be pre-configured).

Alternatively, modify a first language text adjacent to the third language text in a case that the fifth language text is not found, so as to match a text feature of the first language text with a text feature of the fourth language text. For example, a beginning or an end of the first language text is modified to have a same final as that of the fourth language text.

6) Use the second information as the first information in a case that all of the plurality of first language texts are spliced into the second information.

The foregoing splicing processing may be performed at a beginning position or an end position of one language text. The foregoing text feature may be a phonetic feature, such as a final or an initial, of a beginning or an end of a sentence in one language text. Text feature matching means having same or similar finals or initials. For example, finals at the beginnings of sentences of two language texts are the same. The text feature may also be a word feature, such as a reduplicated word and a word type (such as "水果(shuǐ guǒ)" or "建筑(jiàn zhù)"). In a case that both of beginnings or ends of sentences of two language texts are reduplicated words, it is considered that the sentences match each other. In a case that both of beginnings or ends of sentences of two language texts are words representing "水果(shuǐ guǒ)", it is considered that the sentences match each other.

Step S3042: Convert the first information into the first audio according to a target music score.

Optionally, a quantity of lyrics corresponding to each beat in the target music score may be pre-configured.

Distribution of a quantity of words may be generated in advance according to a communication subject and a communication channel of an application. Assuming that the images to be uploaded by the user are mostly about a person or a landscape. A technical side may collect a large quantity of images of these types in advance, perform image description generation, count a quantity of words generated, and obtain a corresponding conclusion (a quantity of words in a single sentence of lyrics) from overall distribution. For example, quantities of words are mainly distributed between 6 and 20.

For words within the foregoing word distribution range, a quantity of lyrics corresponding to each beat in a section of beats corresponding to a sentence of lyrics may be pre-configured. As shown in FIG. 5, a correspondence between the eight-word lyrics "城市中的高楼大厦(chéng shì zhōng de gāo lóu dà shà)" and a section of beats (including 4 beats) may be: first four words "城市中的(chéng shì zhōng de)" correspond to Beat 1, fifth to seventh words "高楼大(gāo lóu dà)" correspond to Beat 2, last word "厦(shà)" corresponds to Beat 3, and Beat 4 is empty. In FIG. 5, only eight-word lyrics and thirteen-word lyrics are used as examples, lyrics having other quantity of words are similar to these, and are not described herein again.

Optionally, after the first audio is obtained and before the feedback carrying the target media is transmitted to the client, the image set and the first audio may be filled in the video template to obtain the target media. The target media is carried in the feedback and transmitted to the client.

For example, a second image in the template is replaced with the image set, and a second audio in the template is replaced with the first audio.

In the technical solution provided by step S306, the server transmits feedback to the client, and indicates, through the feedback, target media used for presentation on the client. The target media carries at least the first audio.

Optionally, in a case that the server produces a template video, in case of transmitting the feedback to the client, the server transmits the feedback carrying the target media to the client. The target media is video carrying the first audio and the image set. In a case that the client produces a template video, the server transmits the feedback carrying the first audio to the client.

In an optional embodiment, an example in which the technical solution of this embodiment of this application is implemented on a mobile phone is used below to describe an implementation of this application in detail.

Figure 6:
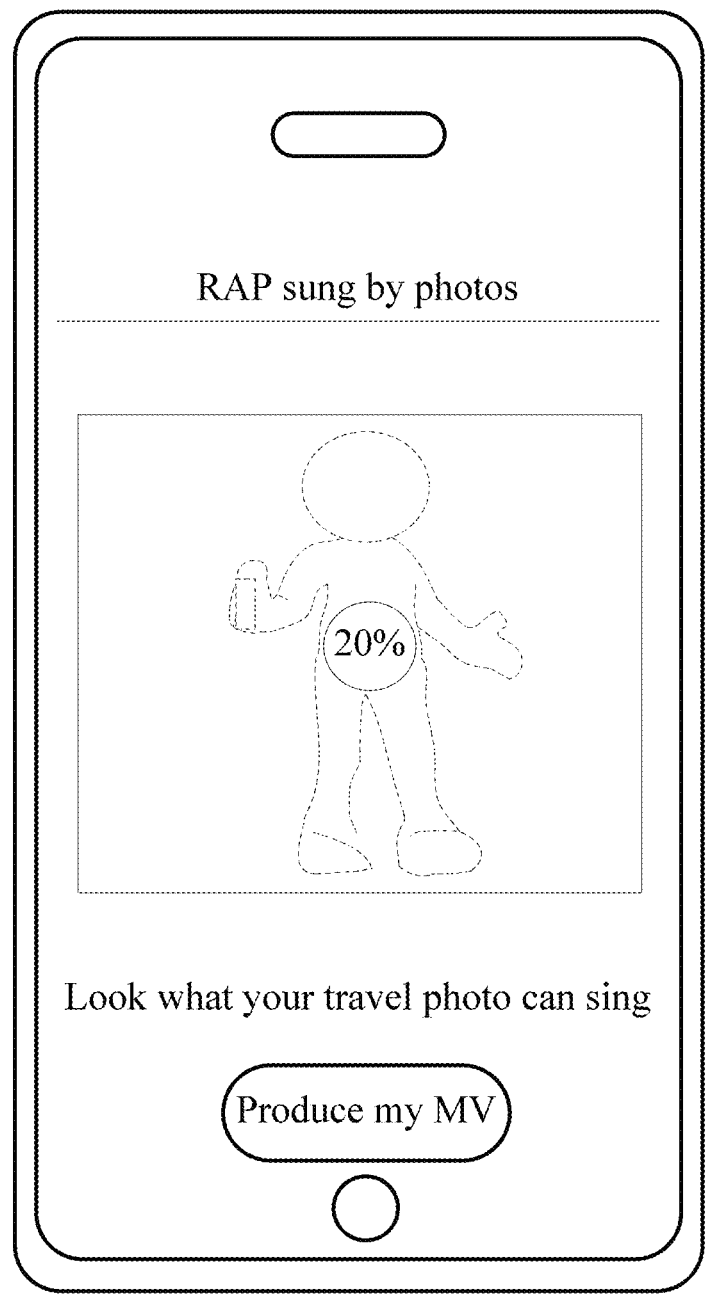
FIG. 6 is a schematic diagram of an optional user interface according to an embodiment of this application.
Figure 7:
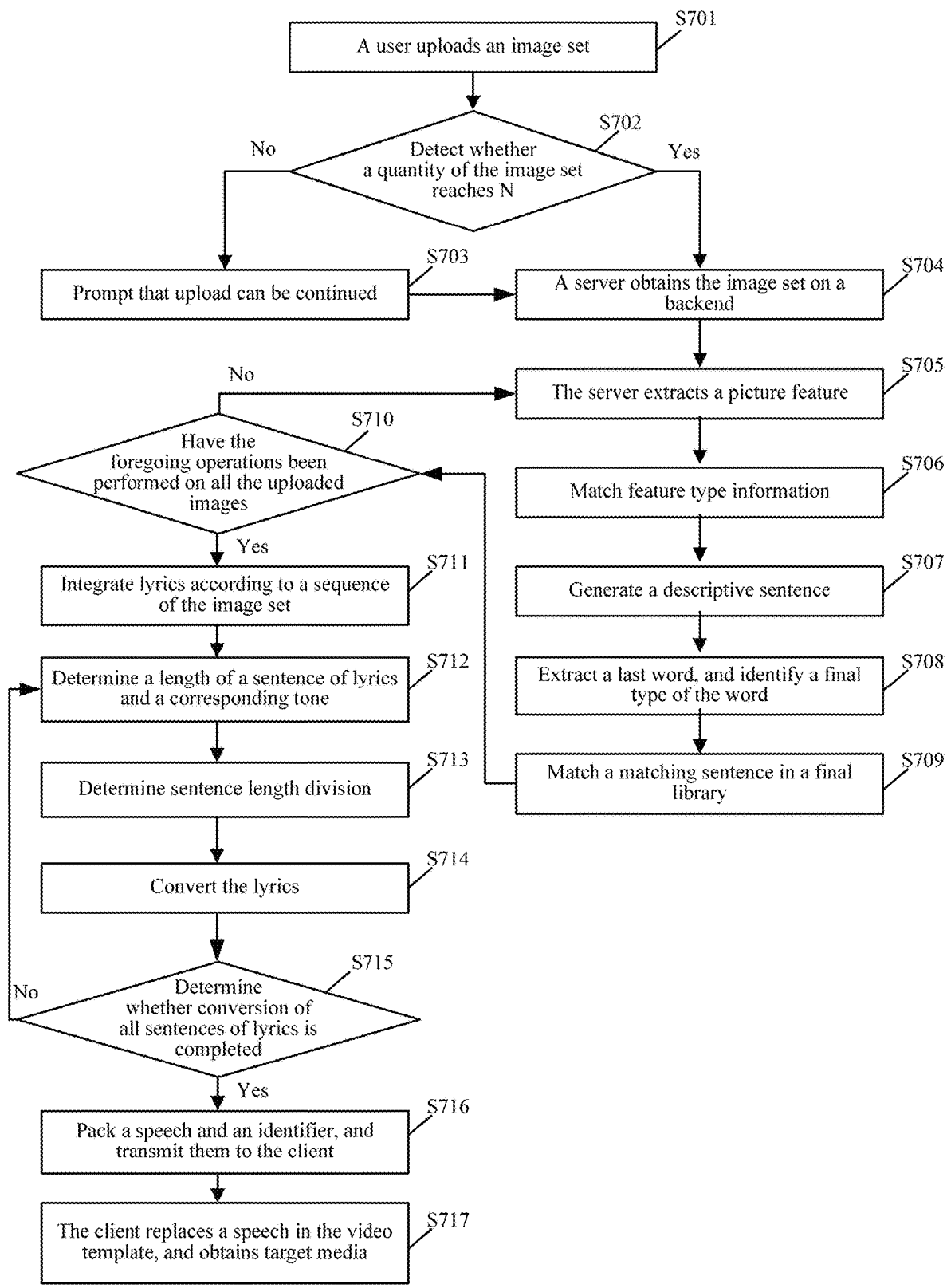
FIG. 7 is a flowchart of another optional method for presenting media information according to an embodiment of this application.

As shown in FIG. 6, the user may view target media MV (a cache progress, for example 20%, may be displayed in a playback process) produced according to the method of this embodiment of this application through an interface (such as a "RAP sung by photos" interface) of, for example, an instant messaging application or a social application. Under the prompt "Look what your travel photo can sing", the user may produce an MV of a subset by clicking on "Produce my MV". Specific steps are as shown in FIG. 7.

Figure 8:
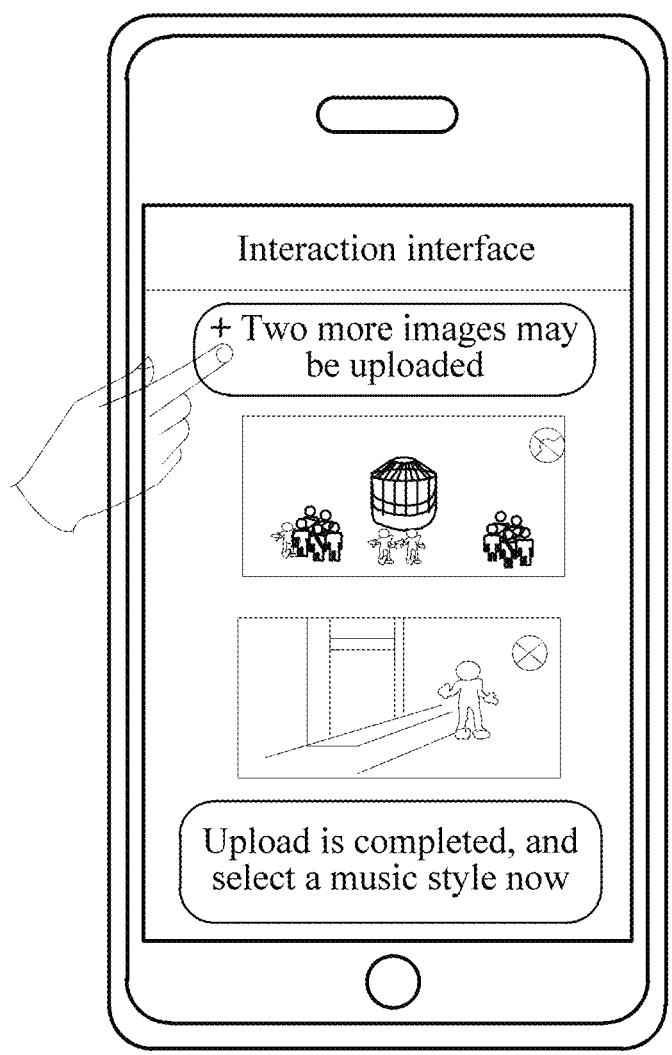
FIG. 8 is a schematic diagram of another optional user interface according to an embodiment of this application.

Step S701: A user uploads an image set. The image set may include one or more images. As shown in FIG. 8, the user may select one or more to-be-uploaded image through an interaction interface.

Step S702: Detect whether a quantity of the image set reaches N (for example, 5), perform step S704 in a case that the quantity reaches N, and perform step S703 in a case that the quantity does not reach N.

Step S703: Prompt that upload can be continued, by using "Two more images may be uploaded" as shown in FIG. 8, and perform step S704 in a case that the user confirms not to continue the upload.

Step S704: A server obtains the image set on a backend.

Step S705: The server extracts a picture feature (that is, an image feature).

Step S706: Match feature type information (such as an object type and a scene type).

Step S707: Generate a descriptive sentence (such as a first language text).

Step S708: Extract a last word of the foregoing descriptive sentence, and identify a final type of the word.

Step S709: Match a matching sentence (such as a second language text) in a final library, and extract the matching sentence.

For one image above, one descriptive sentence and one matching sentence, that is, a two sentences of lyrics in total, may be generated correspondingly. To ensure a length of a song generated finally, the user is guided to upload a plurality of images on the interaction interface.

Step S710: Determine whether the foregoing operations (generating a description and a matching sentence) have been performed on all the uploaded images. In a case that the foregoing operations are performed on all the uploaded images, step S711 is performed; otherwise, step S705 is performed.

Step S711: Integrate lyrics (that is, the descriptions and the matching sentences) according to a sequence of the images.

Step S712: Determine a length of a current sentence of lyrics and a corresponding tone.

Step S713: Determine sentence length division.

Step S714: Convert the lyrics (for example, use TTS).

Step S715: Determine whether conversion of all sentences of lyrics is completed. In a case that conversion of all sentences of lyrics is completed, step S716 is performed; otherwise step S712 is performed.

Step S716: Pack the speech and the identifier, and transmit the packed speech and identifier to the client.

Step S717: The client replaces the speech in the video template, and obtains the target media (or referred to as a target video).

Figure 9:
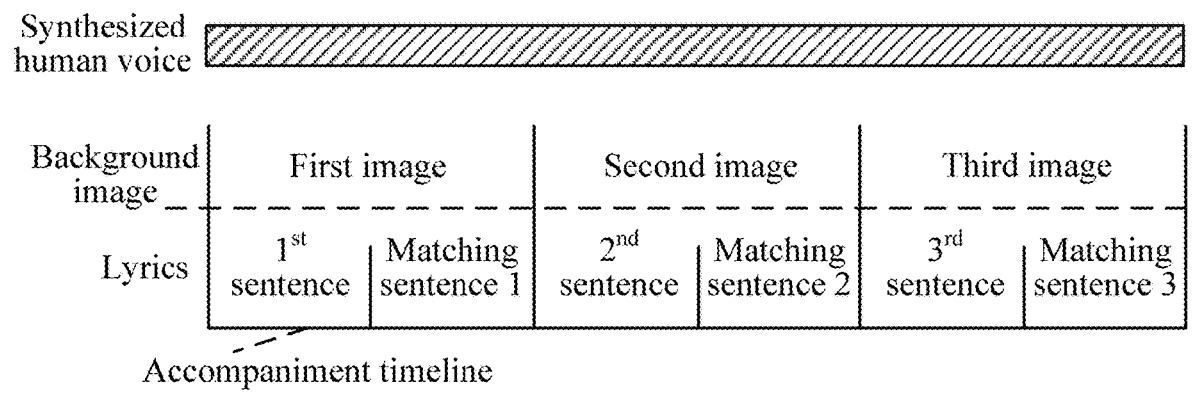
FIG. 9 is a schematic diagram of an optional video template according to an embodiment of this application.

As shown in FIG. 9, an accompaniment audio timeline is used as a reference, background images and lyrics (including an $n^{th}$ image description and a matching sentence n, where n is an image identifier) are used as visible elements, and a video synthesis template (that is, a video template) is pre-designed by setting a time point at which each visible element appears or disappears, a style, and a transition dynamic effect (vertical lines on a timeline can represent the transition dynamic effect).

Step S718: Present a music MV related to the image of the user.

In a case that the backend transmits back the lyrics and synthesized human voice, a frontend replaces background images and lyrics of the video synthesis template with the images uploaded by the user and the lyrics, and superimposes the synthesized voice thereon to finally represent the user with a customized music MV. In a case that a quantity of the images uploaded by the user is relatively small, the images are repeated in multiples to satisfy a minimum display length of the MV.

In the foregoing embodiment, using a rap style as an example, a rap song is selected, the backend prepares a corresponding final library, a tone, or a beat scheme in advance, and after uploading a plurality of images, the user may obtain a rap song with lyrics created by using the images. The user may freely select another song style to create different songs for the same images, which greatly improves user experience.

In this embodiment of this application, the user is guided to upload a plurality of images on the interface, and transmit request for singing the images. After receiving the request, the backend first converts the plurality of images into a plurality of descriptive sentences (with different quantities of words) by using a technical interface of image description generation; then according to a final of each last word, separately matches a set sentence to integrate it into the lyrics, to control an integration degree between the lyrics and the melody, so as to ensure an effect of singing; and sings the lyrics by using a speech synthesis technology, and performs beat compatibility and adjustment according to quantities of words in the descriptive sentence, and obtains a song. Finally, the frontend combines the images, lyrics, and synthesized human voice, into a music MV by using animation effects. In addition, after the music MV is completed, the music MV is presented to the user on the interface. The technical solution of this embodiment of this application may be applied to the field of a description generation application of an AI image project, reduce a threshold of interaction between the user and a technical skill such as AI image description generation, and provide a new idea and an implementation for integration and implementation of AI capabilities.

For the ease of description, the foregoing method embodiments are expressed as a series of action combinations. However, a person skilled in the art needs to understand that the embodiments of this application are not limited to the described sequence of the actions, because according to the embodiments of this application, some steps may be performed in another sequence or simultaneously. Next, a person skilled in the art also needs to learn that, the embodiments described in the specification all fall within optional embodiments, and the related actions and modules are not necessarily required by this application.

Through the descriptions of the preceding embodiments, a person skilled in the art may understand that the methods according to the foregoing embodiments may be implemented by hardware only or by software and a necessary universal hardware platform. However, in most cases, using software and a necessary universal hardware platform are preferred. Based on such an understanding, the technical solutions of the embodiments of this application essentially, or the part contributing to the prior art may be implemented in a form of a software product. The computer software product is stored in a storage medium (such as a ROM/ RAM, a magnetic disk, or an optical disc) and includes several instructions for instructing a terminal device (which may be a mobile phone, a computer, a server, a network device, or the like) to perform the methods described in the embodiments of this application.

Figure 10:
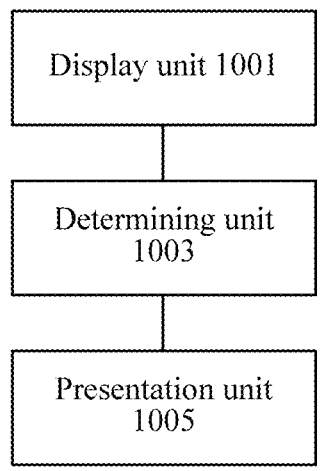
FIG. 10 is a schematic diagram of an optional apparatus for presenting media information according to an embodiment of this application.

According to another aspect of the embodiments of this application, an apparatus for presenting media information configured to perform the foregoing method for presenting the media information is provided. FIG. 10 is a schematic diagram of an optional apparatus for presenting media information according to an embodiment of this application. The apparatus may include one or more processors and one or more memories storing program units. The program units are executed by the processor. As shown in FIG. 10, the program units include: a display unit 1001, a determining unit 1003 and a presentation unit 1005.

The display unit 1001 is configured to display an interaction interface, the interaction interface being an interaction interface configured to obtain an image.

Optionally, in a case that the media information (such as a video or audio) is produced by a server, the foregoing interaction interface is an upper-layer display interface of an image upload interface between a terminal and the server. The upload interface may be informed of a to-be-uploaded image through an interactive operation (for example, clicking on the symbol "+" in an interface A shown in FIG. 1 and selecting a corresponding image) on the interaction interface.

The determining unit 1003 is configured to obtain target media in a case that an image set is obtained through the interaction interface, the target media carrying at least first audio, and the first audio being audio generated according to an image feature of the image set.

Optionally, in a case that the target media only carries the first audio, the target media is equivalent to audio media information. The target media may further carry text information, for example, text information (such as lyrics) corresponding to the first audio. In this case, the target media is equivalent to music media information with embedded lyrics. The target media may further carry the image set. In this case, the target media is equivalent to video such as an MV video.

The quantity of the foregoing image set is at least one. A plurality of image set is selected preferably to make the produced target media more abundant. Producing the first audio means regenerating first audio according to the image feature corresponding to the image instead of selecting one of a plurality of pieces of preset audio (such as background music) for an image. That is, the obtained pieces of first audio are different in response to different image set.

The reason why the first audio is generated according to the image feature in the image is that scenes or photographed objects of different images usually have a specific artistic conception. Similarly, different types of music audio (the first audio) usually represent a specific artistic conception. Regenerating first audio according to the image feature in the image means generating first audio that matches the artistic conception.

The presentation unit 1005 is configured to present the target media.

The display unit 1001 in this embodiment may be configured to perform step S202 in the embodiments of this application, the determining unit 1003 in this embodiment may be configured to perform step S204 in the embodiments of this application, and the presentation unit 1005 in this embodiment may be configured to perform step S206 in the embodiments of this application.

Implemented examples and application scenarios of the foregoing modules are the same as those of the corresponding steps, but are not limited to the content disclosed by the foregoing embodiments. The foregoing modules can operate as a part of the apparatus in a hardware environment as shown in FIG. 1, and can be implemented through software or hardware.

Through the foregoing modules, the target media is obtained in a case that the image set is obtained through the interaction interface, the target media carries at least first audio, and the first audio is generated according to an image feature of the image set; and the target media is presented on the client. Because a process of generating the target media is performed by the terminal or the server, the technical problem that steps of producing media information in the related technology are relatively complex may be resolved, so as to achieve a technical effect of reducing the complexity of producing media information.

The determining unit may include: a transmitting module, configured to transmit request to a server, the request carrying a image set, and the server being configured to generate first audio according to an image feature of the image set; and a determining module configured to receive feedback returned by the server in response to the request and determine target media at least according to the feedback, the feedback being used to indicate the first audio.

Optionally, the determining module may be further configured to determine the target media according to the image set and the first audio, the target media being video carrying the first audio and the image set.

Optionally, the determining module may be further configured to: fill the image set and the first audio into a video template to obtain the target media; and obtain the target media carried in the feedback, the server being configured to fill the image set and the first audio into the video template and add the obtained target media to the feedback for transmitting the feedback formation to the client, the first audio being music audio with first information as lyrics, and the first information being used to represent the image feature of the image set.

Optionally, the transmitting module may be further configured to transmit request carrying a music type identifier to the server, the server being configured to convert the first information into the first audio of a music type, the music type being a music type indicated by the music type identifier.

Optionally, the presentation unit may alternatively be configured to play the target media on the client; or present identifier information of the target media on the client.

Figure 11:
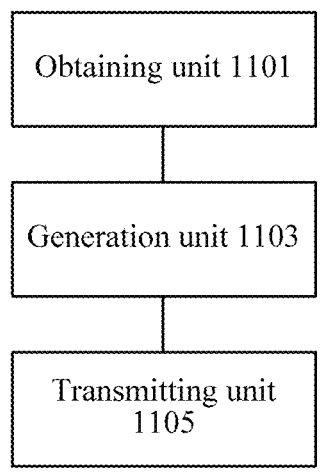
FIG. 11 is a schematic diagram of another optional apparatus for presenting media information according to an embodiment of this application.

According to another aspect of the embodiments of this application, an apparatus for presenting media information configured to perform the foregoing method for presenting the media information is provided. FIG. 11 is a schematic diagram of an optional apparatus for presenting media information according to an embodiment of this application. The apparatus may include one or more processors and one or more memories storing program units. The program units are executed by the processor. As shown in FIG. 11, the program units include: an obtaining unit 1101, a generation unit 1103 and a transmitting unit 1105.

The obtaining unit 1101 is configured to obtain request transmitted by a client, the request carrying a image set.

The generation unit 1103 is configured to generate first audio based on the image set, the first audio being audio generated according to an image feature of the image set.

The transmitting unit 1105 is configured to transmit feedback to the client, and indicate, through the feedback, target media used for presentation on the client, the target media carrying at least the first audio.

Through the foregoing technical solution, in a case that the request transmitted by the client is obtained, the first audio is generated based on the image set carried in the request. The first audio is audio generated according to the image feature of the image set. Feedback is transmitted to the client, and the feedback is used to indicate the target media used for presentation on the client. The target media carries at least the first audio. Because the process of generating the target media is performed by the server, the technical problem that steps of producing media information in the related technology are relatively complex may be resolved, so as to achieve a technical effect of reducing the complexity of producing media information.

Optionally, the generation unit may further include: an obtaining module configured to obtain first information used to represent an image feature of the image set and obtain a music score of a music type, the music type being a music type indicated by a music type identifier carried by the request; and a conversion module configured to convert the first information into the first audio according to a target music score (the music score of the music type).

Optionally, the obtaining module may be further configured to: identify a scene feature and/or an object feature in the image set; combine words used to represent the scene feature and/or the object feature in the image set into a first language text; and determine the first information according to the first language text.

Optionally, the obtaining module may be further configured to: search for, according to the music type, a second language text matching the first language text of the image set; and combine the first language texts of a plurality of the image set and the corresponding second language texts into the first information, in the first information, a first language text corresponding to an image set being adjacent to a second language text corresponding to the same image set.

Optionally, the transmitting unit may be further configured to: transmit feedback carrying the first audio to the client; or transmit feedback carrying the target media to the client, the target media being video carrying the first audio and the image set.

Optionally, the apparatus of this embodiment of this application may further include: a filling unit configured to fill, before the feedback carrying the target media is transmitted to the client, the image set and the first audio in a video template to obtain the target media, the target media being carried in the feedback and transmitted to the client.

In this embodiment of this application, the user is guided to upload a plurality of images on the interface, and transmit request for singing the images. After receiving the request, the backend first converts the plurality of images into a plurality of descriptive sentences (with different quantities of words) by using a technical interface of image description generation; then according to a final of each last word, separately matches a set sentence to integrate it into the lyrics, to control an integration degree between the lyrics and the melody, so as to ensure an effect of singing; and sings the lyrics by using a speech synthesis technology, and performs beat compatibility and adjustment according to quantities of words in the descriptive sentence, and obtains a song. Finally, the frontend combines the images, lyrics, and synthesized human voice, into a music MV by using animation effects. In addition, after the music MV is completed, the music MV is presented to the user on the interface. The technical solution of this embodiment of this application may be applied to the field of a description generation application of an AI image project, reduce a threshold of interaction between the user and a technical skill such as AI image description generation, and provide a new idea and an implementation for integration and implementation of AI capabilities.

Implemented examples and application scenarios of the foregoing modules are the same as those of the corresponding steps, but are not limited to the content disclosed by the foregoing embodiments. The foregoing modules can operate as a part of the apparatus in a hardware environment as shown in FIG. 1, and can be implemented through software or hardware. The hardware environment includes a network environment.

According to another aspect of the embodiments of this application, an electronic apparatus configured to implement the foregoing method for presenting the media information is provided, and the electronic apparatus may be a server or a terminal.

Figure 12:
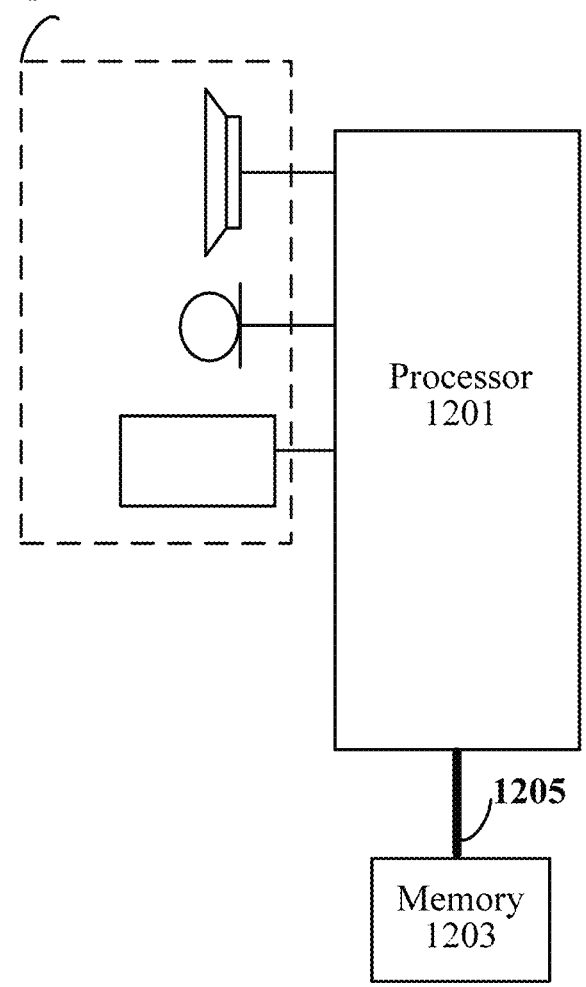
FIG. 12 is a structural block diagram of an electronic apparatus according to an embodiment of this application.

FIG. 12 is a structural block diagram of an electronic apparatus according to an embodiment of this application. An example in which the electronic apparatus is a terminal is used below for description. As shown in FIG. 12, the terminal may include: one or more (only one shown in FIG. 12) processors 1201, a memory 1203, and a transmission apparatus 1205 (for example, the transmitting unit in the foregoing embodiments). As shown in FIG. 12, the terminal may include an input and output device 1207.

The memory 1203 may be configured to store a software program or a module, such as a program instruction/module corresponding to the method and apparatus for presenting media information in the embodiments of this application. The processor 1201 executes various functional applications and data processing by running the software program and module stored in the memory 1203, to implement the foregoing method for presenting media information. The memory 1203 may include a high-speed random memory, and may further include a nonvolatile memory such as one or more magnetic storage devices, a flash memory, or another nonvolatile solid-state memory. In some instances, the memory 1203 may further include memories remotely disposed relative to the processor 1201, and these remote memories may be connected to the terminal through a network. Instances of the network include, but are not limited to, the Internet, an intranet, a local area network, a mobile communications network, and a combination thereof.

The foregoing transmission apparatus 1205 is configured to receive or transmit data through a network, and may be further configured to transmit data between the processor and the memory. A specific instance of the foregoing network may include a wired network or a wireless network. In an instance, the transmission apparatus 1205 includes a network interface controller (NIC) that may be connected to another network device and a router by using a network cable, so as to communicate with the Internet or a local area network. In an instance, the transmission apparatus 1205 is a radio frequency (RF) module that is configured to communicate with the Internet in a wireless manner.

Specifically, the memory 1203 is configured to store an application program.

The processor 1201 may invoke, through the transmission apparatus 1205, an application stored in the memory 1203, to perform the following steps:

displaying an interaction interface, the interaction interface being an interaction interface that is on a client and that is configured to obtain an image; obtaining target media in a case of obtaining an image set through the interaction interface, the target media carrying at least first audio, the first audio being audio generated according to an image feature of the image set; and presenting the target media on the client.

The processor 1201 is also configured to perform the following steps:

obtaining request transmitted by a client, the request carrying a image set; generating first audio based on the image set, the first audio being audio generated according to an image feature of the image set; and transmitting feedback to the client, and indicating, through the feedback, target media used for presentation on the client, the target media carrying at least the first audio.

By using the embodiments of this application, the target media is obtained in a case that the image set is obtained through the interaction interface, the target media carries at least first audio, and the first audio is generated according to an image feature of the image set; and the target media is presented on the client. Because a process of generating the target media is performed by the terminal or the server, the technical problem that steps of producing media information in the related technology are relatively complex may be resolved, so as to achieve a technical effect of reducing the complexity of producing media information.

Optionally, for specific examples in this embodiment, refer to the examples described in the foregoing embodiments. Details are not described again in this embodiment.

A person of ordinary skill in the art may understand that, the structure shown in FIG. 12 is only illustrative. The electronic apparatus may be a terminal device such as a smartphone (such as an Android mobile phone or an iOS mobile phone), a tablet computer, a palmtop computer, a mobile Internet device (MID), or a PAD. FIG. 12 does not limit the structure of the foregoing electronic apparatus. For example, the terminal may alternatively include more or less components (such as a network interface and a display apparatus) than those shown in FIG. 12, or has a configuration different from that shown in FIG. 12.

A person of ordinary skill in the art may understand that all or some of the steps of the various methods of the foregoing embodiments may be implemented by a program instructing relevant hardware of the terminal device. The program may be stored in a computer-readable storage medium. The storage medium may be a flash disk, a read-only memory (ROM), a random access memory (RAM), a magnetic disk, or an optical disc.

The embodiments of this application further provide a storage medium. Optionally, in this embodiment, the storage medium may be configured to execute program code of the method for presenting media information.

Optionally, in this embodiment, the storage medium may be located in at least one of a plurality of network devices in the network shown in the foregoing embodiment.

Optionally, in this embodiment, the storage medium is configured to store program code used to perform the following steps:

S21: Display an interaction interface, the interaction interface being an interaction interface that is on a client and that is configured to obtain an image.

S22: Obtain target media in a case that an image set is obtained through the interaction interface, the target media carrying at least first audio, the first audio being audio generated according to an image feature of the image set.

S23: Display the target media on the client.

Optionally, the storage medium is configured to store program code used to perform the following steps:

S31: Obtain request transmitted by a client, the request carrying a image set.

S32: Generate first audio based on the image set, the first audio being audio generated according to an image feature of the image set.

S33: Transmit feedback to the client, and indicate, through the feedback, target media used for presentation on the client, the target media carrying at least the first audio.

Optionally, for specific examples in this embodiment, refer to the examples described in the foregoing embodiments. Details are not described again in this embodiment.

Optionally, in this embodiment, the foregoing storage medium may include but is not limited to: various mediums that may store program code, such as a USB flash disk, a read-only memory (ROM), a random access memory (RAM), a mobile hard disk drive, a magnetic disk, an optical disc and the like.

The sequence numbers of the foregoing embodiments of this application are merely for description purpose but do not indicate the preference of the embodiments.

In a case that the integrated unit in the foregoing embodiments is implemented in the form of a software function unit and sold or used as an independent product, the integrated unit may be stored in the foregoing computer-readable storage medium. Based on such understanding, the technical solutions of the embodiments of this application essentially, or some contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, descriptions of the embodiments have different emphases, and as for parts that are not described in detail in one embodiment, reference can be made to the relevant descriptions of the other embodiments.

In the several embodiments provided in the embodiments of this application, it is to be understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software functional unit.

The foregoing descriptions are merely exemplary implementations of the present invention. A person of ordinary skill in the art may make several improvements or polishing without departing from the principle of the embodiments of this application, and the improvements or polishing falls within the protection scope of the the embodiments of this application.

INDUSTRIAL APPLICABILITY

In the embodiments of this application, target media is obtained in a case that an image set is obtained through the interaction interface, the target media carries at least first audio, and the first audio is generated according to an image feature of the image set; and the target media is presented on the client. Because a process of generating the target media is performed by a terminal or a server, the technical problem that steps of producing media information in the related technology are relatively complex may be resolved, so as to achieve a technical effect of reducing the complexity of producing media information.

What is claimed is:

1. A method for presenting media information, comprising:
    displaying, by a device comprising a memory storing instructions and a processor in communication with the memory, an interaction interface;
    obtaining, by the device, an image set through the interaction interface, the image set comprising at least one image, by:
        in response to a quantity of the image set is less than a threshold, displaying, by the device, prompt information in the interaction interface, the prompt information comprising a quantity of images that can be uploaded,
        in response to an upload event being detected on the interaction interface, obtaining, by the device, the image set according to a path indicated by the upload event, and
        updating, by the device, the prompt information with the quantity of images that can be uploaded;
    obtaining, by the device, target media based on the image set through the interaction interface, the target media comprising a first audio generated according to an image feature of the image set; and
    presenting, by the device, the target media.

2. The method according to claim 1, wherein obtaining the target media comprises:
    transmitting, by the device, a request to a server, the request comprising the image set, and the server being configured to generate the first audio according to the image feature of the image set; and
    receiving, by the device, a feedback returned by the server in response to the request, and determining the target media at least according to the feedback, the feedback being used to indicate the first audio.

3. The method according to claim 2, wherein determining the target media at least according to the feedback comprises:
    determining the target media according to the image set and the first audio, the target media being a video comprising the first audio and the image set.

4. The method according to claim 3, wherein:
    the first audio comprises music audio having first information as lyrics, and the first information is used to represent the image feature of the image set; and
    determining the target media according to the image set and the first audio comprises:
        filling a video template with the image set and the first audio to obtain the target media; or
        obtaining the target media carried in the feedback, wherein the server is configured to fill the video template with the image set and the first audio to obtain the target media, add the obtained target media to the feedback, and transmit the feedback to the device.

5. The method according to claim 2, wherein:
    the request comprises a music type identifier, the music type identifier indicating a music type; and
    the server is configured to convert first information into the first audio of the music type.

6. The method according to claim 1, wherein:
    the target media comprises a video; and
    the method further comprises:
        presenting, during playing of the video, the image set in the video, and
        playing music audio using first information as lyrics, the first audio comprising the music audio, a section of lyrics in the first information being used to represent an image feature of an image of the image set.

7. A device for presenting media information, comprising:
    a memory storing instructions; and
    a processor in communication with the memory, wherein, when the processor executes the instructions, the processor is configured to cause the device to:
        display an interaction interface,
        obtain an image set through the interaction interface, the image set comprising at least one image, by:
            in response to a quantity of the image set is less than a threshold, displaying prompt information in the interaction interface, the prompt information comprising a quantity of images that can be uploaded,
            in response to an upload event being detected on the interaction interface, obtaining the image set according to a path indicated by the upload event, and
            updating the prompt information with the quantity of images that can be uploaded,
        obtain target media based on the image set through the interaction interface, the target media comprising a first audio generated according to an image feature of the image set, and
        present the target media.

8. The device according to claim 7, wherein, when the processor is configured to cause the device to obtain the target media, the processor is configured to cause the device to:
    transmit a request to a server, the request comprising the image set, and the server being configured to generate the first audio according to the image feature of the image set;
    receive a feedback returned by the server in response to the request; and
    determine the target media at least according to the feedback, the feedback being used to indicate the first audio.

9. The device according to claim 8, wherein, when the processor is configured to cause the device to determine the target media at least according to the feedback, the processor is configured to cause the device to:

determine the target media according to the image set and the first audio, the target media being a video comprising the first audio and the image set.

10. The device according to claim 9, wherein:
the first audio comprises music audio having first information as lyrics, and the first information is used to represent the image feature of the image set; and
when the processor is configured to cause the device to determine the target media according to the image set and the first audio, the processor is configured to cause the device to:
filling a video template with the image set and the first audio to obtain the target media; or
obtaining the target media carried in the feedback, wherein the server is configured to fill the video template with the image set and the first audio to obtain the target media, add the obtained target media to the feedback, and transmit the feedback to the device.

11. The device according to claim 8, wherein:
the request comprises a music type identifier, the music type identifier indicating a music type; and
the server is configured to convert first information into the first audio of the music type.

12. The device according to claim 7, wherein:
the target media comprises a video; and
when the processor executes the instructions, the processor is configured to further cause the device to:
presenting, during playing the video, the image set in the video, and
playing music audio using first information as lyrics, the first audio comprising the music audio, a section of lyrics in the first information being used to represent an image feature of an image of the image set.

13. A non-transitory computer readable storage medium storing computer readable instructions, the computer readable instructions, when executed by a processor, causing the processor to perform:
displaying an interaction interface on a client;
obtaining an image set through the interaction interface, the image set comprising at least one image, by:
in response to a quantity of the image set is less than a threshold, displaying prompt information in the interaction interface, the prompt information comprising a quantity of images that can be uploaded,
in response to an upload event being detected on the interaction interface, obtaining the image set according to a path indicated by the upload event, and
updating the prompt information with the quantity of images that can be uploaded;
obtaining target media based on the image set through the interaction interface, the target media comprising a first audio generated according to an image feature of the image set; and
presenting the target media on the client.

14. The non-transitory computer readable storage medium according to claim 13, wherein, when the computer readable instructions cause the processor to perform the obtaining the target media, the computer readable instructions cause the processor to perform:
transmitting request to a server, the request comprising the image set, and the server being configured to generate the first audio according to the image feature of the image set; and
receiving feedback returned by the server in response to the request, and determining the target media at least according to the feedback, the feedback being used to indicate the first audio.

15. The non-transitory computer readable storage medium according to claim 14, wherein, when the computer readable instructions cause the processor to perform the determining the target media at least according to the feedback, the computer readable instructions cause the processor to perform:
determining the target media according to the image set and the first audio, the target media being a video comprising the first audio and the image set.

16. The non-transitory computer readable storage medium according to claim 15, wherein:
the first audio is music audio using first information as lyrics, and the first information is used to represent the image feature of the image set; and
the determining the target media according to the image set and the first audio comprises:
filling a video template with the image set and the first audio to obtain the target media; or
obtaining the target media carried in the feedback, wherein the server is configured to fill the video template with the image set and the first audio to obtain the target media, add the obtained target media to the feedback, and transmit the feedback to the client.

17. The non-transitory computer readable storage medium according to claim 14, wherein:
the request comprises a music type identifier, the music type identifier indicating a music type; and
the server is configured to convert first information into the first audio of the music type.

18. The non-transitory computer readable storage medium according to claim 13, wherein:
the target media comprises a video; and
when the computer readable instructions are executed by the processor, the computer readable instructions cause the processor to further perform:
presenting, during playing the video, the image set in the video, and
playing music audio using first information as lyrics, the first audio comprising the music audio, a section of lyrics in the first information being used to represent an image feature of an image of the image set.

* * * * *